United States Patent
Fawcett et al.

(10) Patent No.: US 10,367,702 B2
(45) Date of Patent: Jul. 30, 2019

(54) NETWORK DATABASE HOSTING (71) Applicant: HEWLETT PACKARD ENTERPRISE DEVELOPMENT LP, Houston, TX (US)

(72) Inventors: Steven Fawcett, Newcastle (GB); Graham William Welford, Telford (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 366 days.

(21) Appl. No.: 15/032,727

(22) PCT Filed: Oct. 31, 2013

(86) PCT No.: PCT/US2013/067825
§ 371 (c)(1),
(2) Date: Apr. 28, 2016

(87) PCT Pub. No.: WO2015/065444
PCT Pub. Date: May 7, 2015

(65) Prior Publication Data
US 2016/0254966 A1 Sep. 1, 2016

(51) Int. Cl.
*H04L 12/24* (2006.01)
*H04L 29/06* (2006.01)
*G06F 21/62* (2013.01)

(52) U.S. Cl.
CPC .......... *H04L 41/5054* (2013.01); *G06F 21/62* (2013.01); *H04L 63/0428* (2013.01); *H04L 63/105* (2013.01); *H04L 63/20* (2013.01)

(58) Field of Classification Search
CPC ............. H04L 41/5054; H04L 63/0428; H04L 63/105; H04L 63/20; G06F 21/62
See application file for complete search history.

(56) References Cited

U.S. PATENT DOCUMENTS

| | | | |
|---|---|---|---|
| 8,312,419 B2 | 11/2012 | Wilcock et al. | |
| 9,489,271 B1* | 11/2016 | Tsaur | G06F 17/30312 |
| 2005/0268298 A1* | 12/2005 | Hunt | G06F 9/4856 718/1 |
| 2006/0085837 A1 | 4/2006 | Pesati et al. | |
| 2009/0089591 A1* | 4/2009 | Mattsson | G06F 21/6227 713/193 |
| 2010/0174802 A1 | 7/2010 | Chan et al. | |
| 2010/0235003 A1* | 9/2010 | Maly | G06F 1/206 700/276 |

(Continued)

OTHER PUBLICATIONS

Bielstein, V. et al.; IT Trends 2012/13 Riding the Wave of Change; http://www.capitalsecureinformationsolutions.co.uk/Downloads/ITTrends2012-13RidingTheWaveOfChange.pdf; Jan. 2013, 71 Pages.

(Continued)

*Primary Examiner* — Wing F Chan
*Assistant Examiner* — Billy H Ng
(74) *Attorney, Agent, or Firm* — Fabian VanCott (57) ABSTRACT

A method for network database hosting by a processor is described. The method includes supplying a number of servers to host a number of databases. The method also includes hosting a number of databases on the number of servers, in which each of the number of databases implements a distinct security program.

20 Claims, 7 Drawing Sheets

(56) References Cited

U.S. PATENT DOCUMENTS

| | | | |
|---|---|---|---|
| 2011/0138442 A1* | 6/2011 | Vinberg | G06F 21/53 726/1 |
| 2011/0188651 A1* | 8/2011 | Iswandhi | G06F 12/00 380/44 |
| 2011/0307390 A1 | 12/2011 | Ogg | |
| 2012/0084570 A1* | 4/2012 | Kuzin | G06F 21/41 713/182 |
| 2012/0101994 A1 | 4/2012 | Baffier et al. | |
| 2012/0159567 A1 | 6/2012 | Toy et al. | |
| 2012/0185913 A1 | 7/2012 | Martinez et al. | |
| 2012/0246696 A1* | 9/2012 | Boukobza | G06F 21/6227 726/1 |
| 2013/0024258 A1* | 1/2013 | Nargizian | G06Q 30/06 705/14.23 |
| 2013/0124538 A1* | 5/2013 | Lee | G06F 17/3053 707/749 |
| 2013/0185812 A1* | 7/2013 | Lie | G06F 9/45558 726/29 |
| 2013/0311430 A1* | 11/2013 | Iizawa | G06F 17/30575 707/640 |
| 2014/0020107 A1* | 1/2014 | Dodgson | G06F 21/10 726/26 |
| 2014/0258230 A1* | 9/2014 | Wankawala | G06F 17/30371 707/634 |

OTHER PUBLICATIONS

Boroujeni, J.S. et al.;Secure Cloud Application; https://tuhat.halvi.helsinki.fi/portal/files/28513674/cbse13_proceedings.pdf ; Aug. 5, 2013, 80 Pages.

Gandhe, M. et al.; Building Secure, Scalable and Highly Available Magento Stores, Powered by Rackspace Solutions; http://www.rackspace.com/knowledge_center/sites/default/files/whitepaper_pdf/Magento%20Ecommerce%20Architectures%20Whitepaper%202013.pdf; Apr. 24, 2013, 16 Pages.

PCT Search Report/Written Opinion~Application No: PCT/US2013/067825 dated Jul. 25, 2014~12 pages.

* cited by examiner

NETWORK DATABASE HOSTING

BACKGROUND

Businesses and other organizations use electronic devices to store data. As businesses, organizations and other entities continue to grow, so does the amount of data stored on electronic devices. These large amounts of data may be stored in a database.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

As described above, databases may store large amounts of information. The databases may also be used to provide services to a number of users. For example, the United Kingdom's (UK) Department for Work and Pensions (DWP) implements a system to distribute social welfare benefits to many individuals. While current systems and methods may be beneficial in distributing services to a number of individuals, certain inefficiencies may inhibit proper distribution of services. For example, current systems may result in a complex infrastructure with many hardware and other resources to provide the desired service. Additionally, current systems and methods may not allow for scaling of the infrastructure and may suffer from certain security threats.

Accordingly, the present disclosure describes systems and methods for providing scalable and secure network database hosting. The method may implement a number of servers that host a number of databases. The number of servers may allow for horizontal and vertical scaling, and may secure the data from infiltration.

The systems and methods described herein may be implemented in conjunction with any organization's database program. An example of the implementation of the systems and methods described herein in an organization's database program is given as follows. In this example, reference is made to the DWP's Universal Credit (UC) program. The DWP is in the process of reforming the system for providing social welfare benefits to UK citizens of working age. During reformation, the current systems for distribution will be replaced by the UC program.

Under the UC program, an information technology (IT) infrastructure may enable new business processes and links be added to an existing system. Accordingly, the present systems and methods describe such an infrastructure and method for providing service distribution and information storage to the DWP. The infrastructure may be flexible and securely host a number of databases. Moreover, the infrastructure described herein may be scaled incrementally and iteratively to allow additional resources to be added as needed.

The present specification describes a system for network database hosting. The system may include a database supplier to supply a number of databases to store data. Any number of databases may implement a number of encryption operations. The system may also include an infrastructure to host the number of databases. The infrastructure may include a number of servers.

The present specification describes a method for network database hosting by a processor. The method may include supplying a number of servers to host a number of databases. The method may also include hosting a number of databases on the number of servers. Each of the number of databases may implement a distinct security program.

The present specification describes a computer program product for network database hosting. The computer program product may include a computer readable storage medium with computer usable program code embodied therewith. The computer usable program code may include computer usable program code to, when executed by a processor, supply a number of servers to host a number of databases, in which the databases store Universal Credit benefit program information. The computer usable program code may also include computer usable program code to, when executed by a processor, host a number of databases on the number of servers. Each database may implement a distinct security program.

The systems and methods described herein may be beneficial by providing a rapidly scalable infrastructure. For example, additional servers may be added to the infrastructure as needed. In other words, the infrastructure may start small, may be implemented with an existing system, and may also expand. For example, an organization's database program may grow with time to provide additional services to more individuals. Accordingly, the system described herein, may start out small and may grow to have a large user base with databases storing thousands of terabytes of information. Accordingly, the present systems and methods may be beneficial in implementing the changing database program. In some examples, the systems and methods described herein provide horizontal scaling benefits, vertical scaling benefits, and re-use benefits which are discussed below in connection with FIG. 3.

Moreover, the present systems and methods may provide security programs to increase the security of the network-based data hosting. In summary, the present systems and methods may be beneficial for their implementation in an organization's database program and for providing a network-based, flexible, secure, highly available, high performing, and scalable hosted database at a low cost while implementing scalable principles in both design and delivery.

As used in the present specification and in the appended claims, the term "a number of" or similar language may include any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
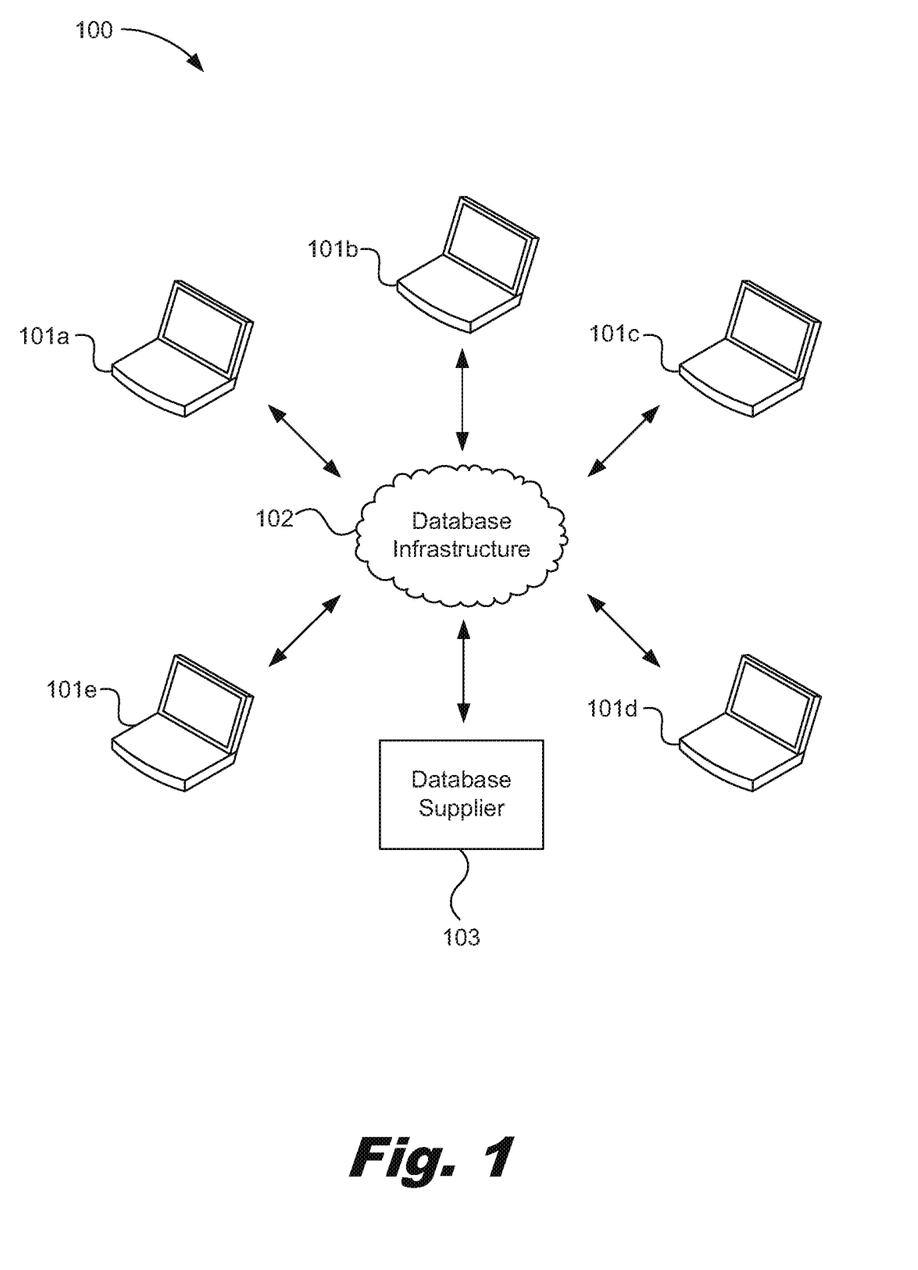
FIG. 1 is a diagram of a system for network database hosting according to one example of the principles described herein.

Referring now to the figures. FIG. 1 is a diagram of a system (100) for scalable and secure network database hosting according to one example of the principles described herein.

The system (100) may include a number of user devices (101). In one example, via a user device (101), a user may access a database infrastructure (102). For example, the users of the user devices (101) may from time-to-time desire to access a database. The database may include information, and may be used to provide services to a user. Via the database infrastructure (102), users may access the database in a secure fashion, while allowing the database infrastructure to scale horizontally and vertically to meet user demand.

While FIG. 1 depicts a particular number of user devices (101), any number of user devices (101) may allow any number of users to access the database infrastructure (102). Examples of user devices (101) include desktop computers, laptop computers, smartphones, personal digital assistants (PDAs), and tablets, among other electronic devices. In other words, a user device (101) may be any electronic device that allows a user to communicate with the database infrastructure (102).

A database infrastructure (102) may be used to manage the database and to provide secure access to the information in the database. The database infrastructure (102) may include a number of databases that store information. For example, the database infrastructure (102) may store information relating to the distribution of an organization's service. Via the database infrastructure (102), users may have access to the data included thereon. The database infrastructure (102) may include a number of servers that host the number of databases. In some examples, a number of servers may be isolated from other servers. Isolating the number of servers in this fashion may be beneficial in that it alleviates an ability to physically access the databases from one location.

The system (100) may include a database supplier (103) to supply the number of databases. As described above, the database supplier (103) may be designed to be implemented in accordance with existing components of a system. Using a database supplier (103) that may be implemented with existing programs may be beneficial in that it may allow the database infrastructure (102) to be implemented, at least in part, with an existing program, while allowing scaling up based on the demands of an application. For example, as an organization's program expands. Accordingly, FIG. 1 depicts a database infrastructure (102) which may include a number of databases and multiple instances of the same database. While FIG. 1 briefly describes the database infrastructure (102), more detail regarding the database infrastructure (102) is given below in connection with FIG. 2.

Figure 2:
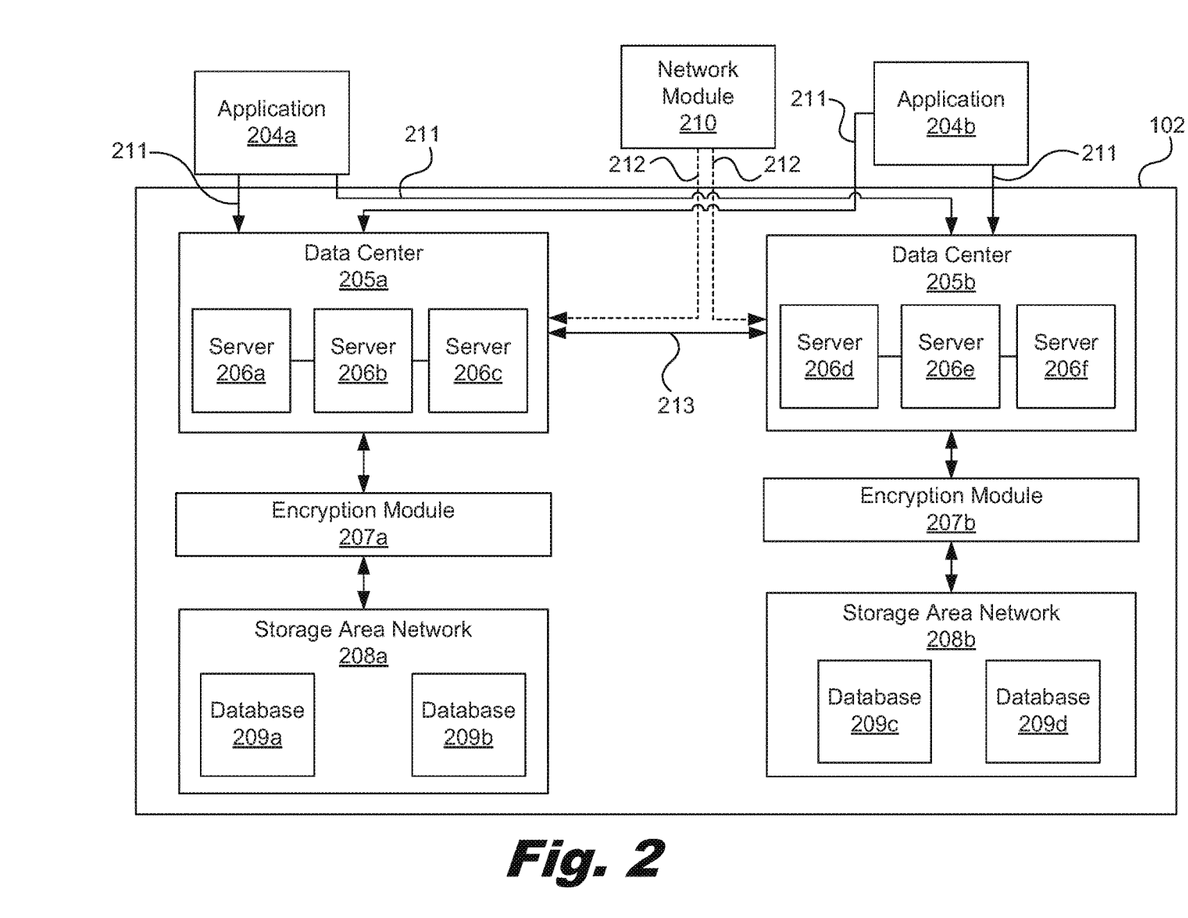
FIG. 2 is a diagram of a database infrastructure for network database hosting according to one example of the principles described herein.

FIG. 2 is a diagram of a database infrastructure (102) for scalable and secure network database hosting according to one example of the principles described herein. The database infrastructure (102) may facilitate access to the databases (209) in a number of ways. For example, via applications (204a, 204b), public users may access the databases (209). Applications (204a, 204b) may access the databases (209) via a public network (211) indicated in FIG. 2 by a number of solid lines. Similarly, via a network module (210), support personnel may access the databases (209). Examples of support personnel include security database administrators and resource database administrators among other support teams. The network module (210) may include a number of monitors to facilitate the monitoring of the data centers (205a, 205b). For example, the network module (210) may include a system monitor and a security monitor.

The network module (210) may access the databases (209) via a management network (212) as indicated by a number of dashed lines. The public network (211) and the management network (212) may afford different access privileges to the various types of users. For example, via the different access methods, the data infrastructure (102) may support data segregation. For example, a financial applications user, via the public network (211) may access a procurement database, a payroll database, and a finance database. By comparison, a database administrator, via the management network (212) may not have access to these databases.

Database segregation may also occur within a database. For example, a first database (209a) may contain a list of customers and bank information for those customers. In this example, a number of users may have access to view the customer list, and a subset of those users may have access to the bank details. In another example, a data may have information about sales and customers. In this example, the data, which may be sensitive, may be restricted to a number of individuals. In yet another example, database segregation may be based on location. For example, users logging into a database from a central office may have access to information. By comparison, users logging into a database from remote locations may have restrictions on the information available to them. Such database segregation may be beneficial by increasing the security of the databases and applications and ensuring data integrity.

In some examples, command rules may be used to increase security. The command rules may indicate individuals, timeframes, and methods of access that may be permitted access to a database (209). The command rules may be implemented inside a database (209).

The data infrastructure (102) may include a number of data centers (205a, 205b). The data centers (205a, 205b) may include a cluster of servers (206) that retrieve information stored on a database (209). In some examples, the servers (206) may retrieve information from multiple databases (209a, 209b). For example, a first server (206a) may retrieve a portion of information from a first database (209a) and a portion of information from a second database (209b). Similarly, a second server (206b) may retrieve a portion of information from the first database (209a) and a portion of information from a second database (209b). Accordingly, the servers (206) within a data center (205) may be interconnected. As depicted in FIG. 2, the databases (209a, 209b, 209c, 209d) may be stored on a storage area network (208a, 208b). Accordingly, as depicted in FIG. 2, the data infrastructure (102) may include a number of databases (209). The data infrastructure (102) also may include a number of instances of a single database (209). For example, a third database (209c) and a fourth database (209d) may be different instances of the same database. In other words, the third database (209c) and the fourth database (209d) may contain the same data.

While FIG. 2 depicts the databases (209) as being distinct from the servers (206), in some examples, the databases (209) may be included within the servers (206).

The data infrastructure (102) may include a number of encryption modules (207a, 207b) to encrypt and decrypt the database information. The encryption modules (207a, 207b) may provide encryption of stored data. In this example, the applications (204a, 204b) may not need to be modified to access the encrypted data. In other words, data may be encrypted when it is written to the databases (209a, 209b, 209c, 209d) and may be decrypted when it is accessed by the applications (204a, 204b). The encryption modules (207a, 207b) may include an encryption switch. The encryption switch may encrypt data stored in different databases (209) differently. For example, a first database (209a) may be encrypted using a first encryption key. A second database (209b) may be encrypted using a different encryption key. Accordingly, if one database (206) is corrupted, remaining databases (206) may remain intact. Security modules (207) that implement distinct security programs may also be beneficial by preventing a single entry point to the database infrastructure (102).

The data centers (205a, 205b) may be coupled together as indicated by the line (213). For example, the data centers (205a, 205b) may be part of a wide area network (WAN). In this configuration, the data centers (205a, 205b) may carry out log shipping. Log shipping may refer to a process wherein information is copied from one data center (205) to another data center (205). For example, a batch of updates made to databases (209a, 209b) on the first data center (205a) may be copied to the second data center (205b). Performing log shipping in this fashion may be beneficial in that ensures the data centers (205) in a data infrastructure (102) are synchronized.

Figure 3:
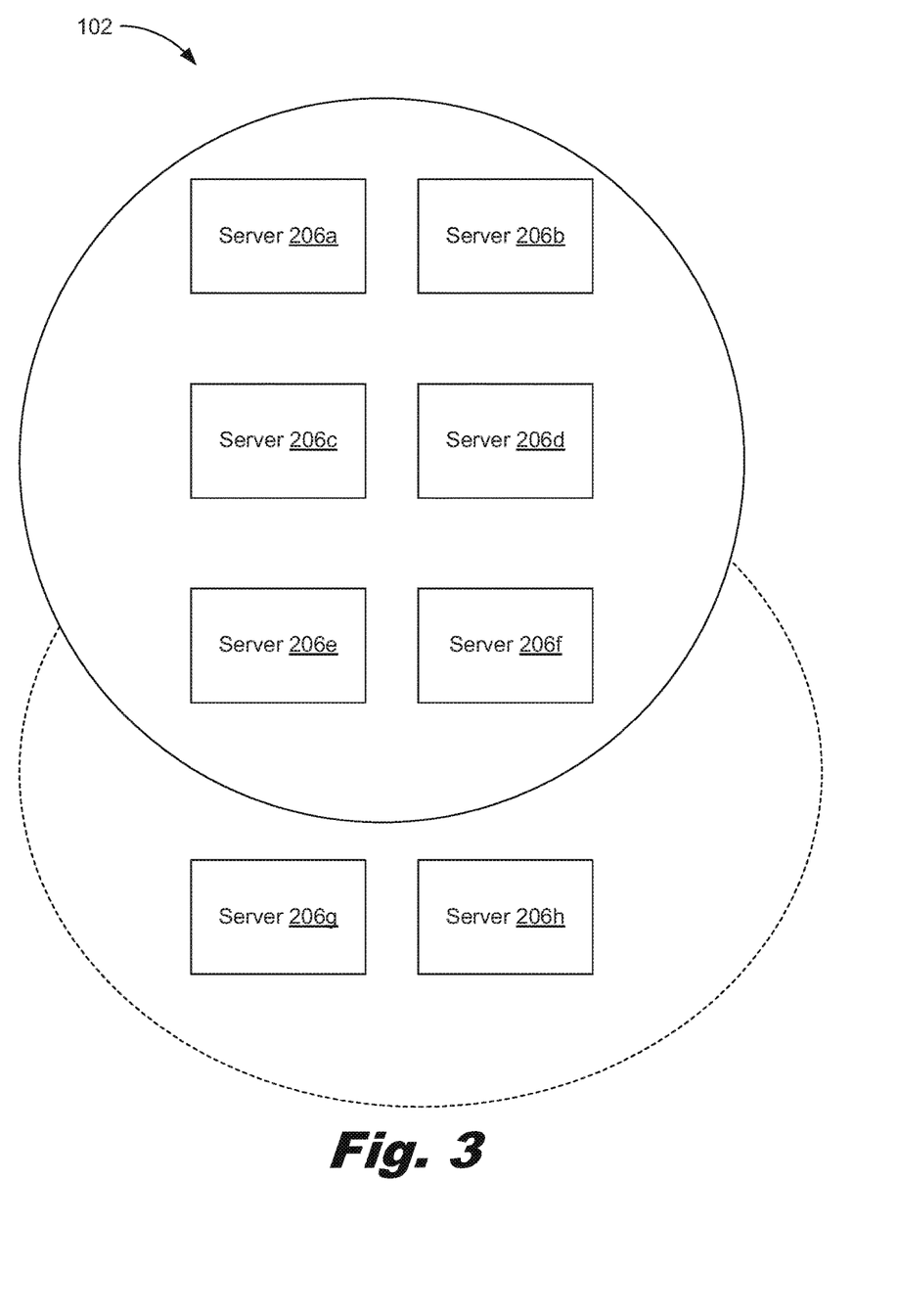
FIG. 3 is a diagram of a database infrastructure for network database hosting according to one example of the principles described herein.

FIG. 3 is a diagram of a database infrastructure (102) for scalable and secure network database hosting according to one example of the principles described herein. As described above, the database infrastructure (102) may include a number of servers (206) to host a number of databases (FIG. 2, 209), a number of instances of a database (FIG. 2, 209), or combinations thereof. In some examples, the database infrastructure (102) and more particularly the number of servers (206) may be implemented using cloud computing. In other words, the number of servers (206) may be grouped in a computing cloud. For example, access to an organization's sales databases may be provided using the number of servers (206) connected through a real-time connection. Accordingly, the security module implemented in the cloud as will be described below may be different from existing security programs implemented on existing cloud-based hosting infrastructures. While FIG. 3 depicts six servers (206), any number of servers (206) may be used to host any number of databases (FIG. 2, 209). The number of servers (206) may be determined based on the characteristics of an application or service.

In some examples, the servers (206) may be remote from one another. In other words, each server (206) may be isolated. Isolating the servers (206) may increase security of the database infrastructure (102) by alleviating an ability to physically access the servers (206) from one geographic location.

The servers (206) may implement a grid infrastructure. A grid infrastructure may refer to a collection of servers (206) implemented in the database infrastructure (102). A grid infrastructure may allow rapid addition of additional servers (206) to the database infrastructure (102). For example, as depicted in FIG. 2, a database infrastructure (102) may include a number of servers (206a, 206b, 206c, 206d, 206e, 206f) as indicated by the solid circle. As a program expands, additional servers (206g, 206h) may be included in the database infrastructure (102), as indicated by the dashed circle, to manage and store the additional benefits data.

More specifically, the data infrastructure (102) may be horizontally scaled. For example, additional servers (206g, 206h) may be added to a system. Horizontal scaling may be beneficial by allowing more servers (206g, 206h) to be added to facilitate the growth, or other characteristics, of a system (FIG. 1, 100). For example, a number of servers (206g, 206h) may be added when the capacity on existing servers cannot expand, to separate data to increase security, and to balance a load of increased user interaction, among other scaling criteria. Horizontal scaling may also allow for high availability. For example, a system may include six servers (206) as indicated by the dashed circle in FIG. 3. In some examples, a database (FIG. 2, 209) may run on four servers. Accordingly, if a first server (206a) is to be turned off for maintenance, then the database (FIG. 2, 209) may initiate a new instance on the remaining servers and maintain complete operational capacity.

The data infrastructure (102) may vertically scale. In other words, in the data infrastructure (102) additional databases (FIG. 2, 209) may be added to a server (206). More specifically, a database (FIG. 2, 209) on a server (206) may utilize more resources. For example, a server (206) may include a certain number of processing units. Upon implementation the server (206) may utilize a subset of the processing units. As the database grows, the server (206) may implement a greater number of the processing units. Another example of a resource that may increase in its availability is memory units on a server (206). While reference is made in FIG. 3 to expanding the number of resources available to a server (206), the number of resources available to a server (206) may also be reduced. For example, as servers (206g, 206h) may be added to the data infrastructure (102), the load on existing servers (206a, 206b, 206c, 206d, 206e, 206f) may be shifted, and resources that may have been used on the existing services may now be freed up. Doing so may be beneficial by allowing a customer to pay for the amount of resources used.

The servers (206) may be different sizes. In other words, the servers (206) may store different amounts of information. For example, smaller servers (206) may be used for smaller applications while larger servers (206) may be used for larger applications. Varying the size of the servers (206) may be beneficial in that server (206) resources may be tailored to a particular system and database infrastructure (102).

In some examples, a number of the servers (206) may be virtual servers. A virtual server may be a logical representation of a server, rather than a physical server. Using virtual servers may be beneficial in that it may reduce the amount of process licenses used, and as a result, may reduce licensing costs, while maintaining ability for vertical growth.

The servers (206) may implement different specifications. For example, in some examples the servers (206) may be from different manufacturers, or may have different operating parameters. Facilitating servers (206) with different specifications may be beneficial in that it allows a variety of servers (206) to be implemented in the database infrastructure (102).

In some examples, a server (206) may reserve memory space. The reserved memory space may be available in the event of a server (206) failure. For example, when a server (206) fails, the database (FIG. 2, 209), or portions thereof, may be relocated to the reserve space to maintain the database (FIG. 2, 209) in light of the failure. When such a failure occurs, a connection may be established with the reserve space of the server (206) to reduce the downtime of the database infrastructure (102). Such a process may be referred to as automatic database failover.

In some examples, a number of the servers (206) may be duplicated. In other words, data stored on the number of databases (FIG. 2, 209) may be replicated on a backup server. Duplicating information in this fashion may be beneficial in assuring that data will not be lost.

The servers (206) may host a number of databases (FIG. 2, 209), a number of instances of a similar database, or combinations thereof. As described above, the databases (FIG. 2, 209) may store data. In one example, the databases (FIG. 2, 209) may store data relating to the UC benefit program. As described above, a number of the servers (206) may be remote to one another. Accordingly, the databases (FIG. 2, 209) may be remote to one another to ensure isolation, and security to the data stored on the databases (FIG. 2, 209).

In some examples, the server (206) may also include an administrator access engine to restrict system administrator access to the number of databases (FIG. 2, 209). For example, a database may be designed such that system administrators may view the performance of a database (FIG. 2, 209), but may not view the data stored on the database (FIG. 2, 209).

The server may also facilitate assigning user specific access rights. For example, the a user specific access right may allow certain users such as doctors and health care providers to access the database (FIG. 2, 209) in a fashion distinct from an ordinary user. Doing so may improve security by preventing connection from users outside a secure boundary.

Figure 4:
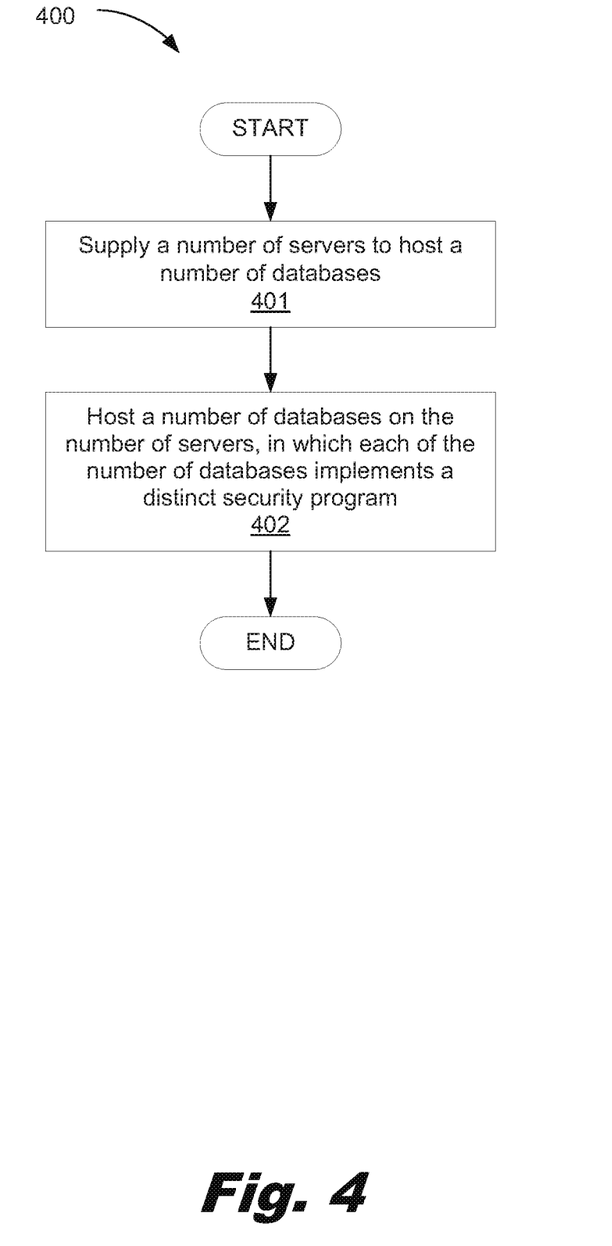
FIG. 4 is a flowchart of a method for network database hosting according to one example of the principles described herein.

FIG. 4 is a flowchart of a method (400) for scalable and secure network database hosting according to one example of the principles described herein. The method (400) may include supplying (block 401) a number of servers (FIG. 2, 206) to host a number of databases (FIG. 2, 209). As described above, the number of servers (FIG. 2, 206) may be implemented as a cloud. In other words, the method (400) may be a cloud-based database hosting method.

As described above, the number of servers (FIG. 2, 206) may be virtual servers, physical servers, or combinations thereof to reduce the amount of processes licenses used on physical servers. Additionally, the servers (FIG. 2, 206) may be any size to facilitate customization of the data infrastructure (FIG. 1, 102) based on application characteristics. For example, when a database (FIG. 2, 209) is first implemented, smaller servers (FIG. 2, 206) may be used. However, as the database (FIG. 2, 209) grows and expands, larger servers (FIG. 2, 206) may be used to facilitate such growth.

Additionally, the servers may be located remote to one another to further increase security of the database infrastructure (FIG. 1, 102). Each server (FIG. 2, 206) may include a security module to execute a number of security programs, encryption components, or combinations thereof. Implementing distinct encryption components and distinct security programs may prevent single entry points to the database infrastructure (FIG. 1, 102).

The servers (FIG. 2, 206) may implement a grid infrastructure. Implementing a grid infrastructure may allow additional servers (FIG. 2, 206) to be added to the database infrastructure (FIG. 1, 102) regardless of the specifications of the additional servers.

Each server (FIG. 2, 206) may host (block 402) a number of databases (FIG. 2, 209). More specifically, each server (FIG. 2, 206) may host (block 402) a number of databases (FIG. 2, 209) in which the number of databases (FIG. 2, 209) implement a distinct security program. As described above, the databases (FIG. 2, 209) may store data. In one example, the databases (FIG. 2, 209) may store data relating to the DWP's social welfare benefit program.

Figure 5:
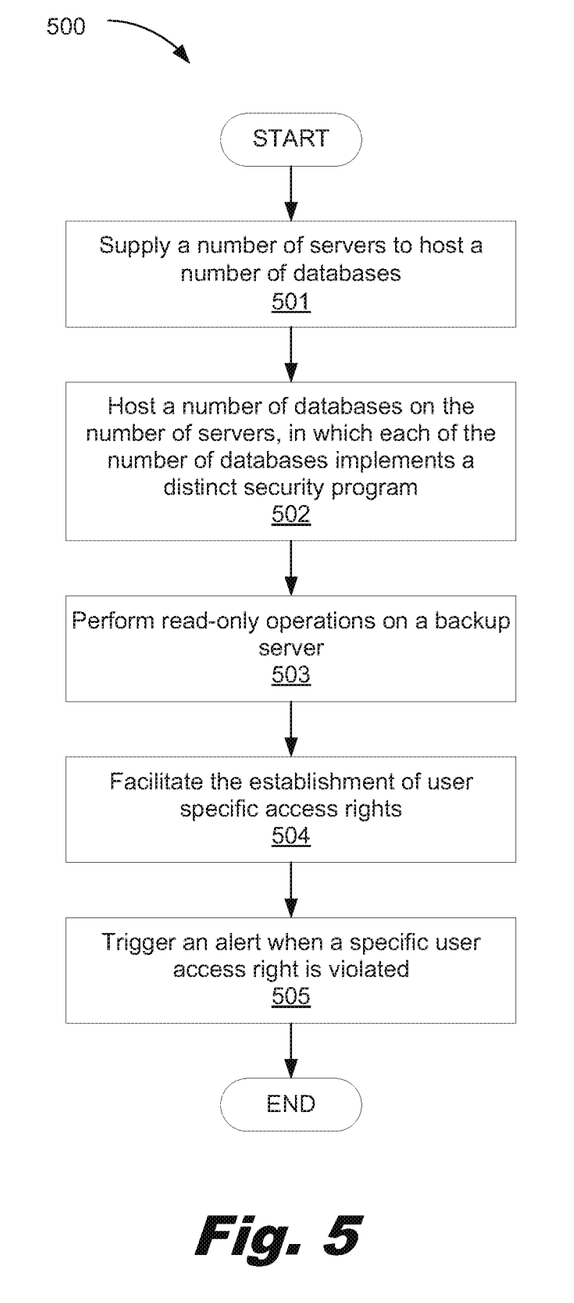
FIG. 5 is a flowchart of another method for database hosting according to another example of the principles described herein.

FIG. 5 is a flowchart of another method (500) for scalable and secure network database hosting according to another example of the principles described herein. The method (500) may include supplying (block 501) a number of servers (FIG. 2, 206) to host a number of databases (FIG. 2, 209). This may be performed as described in connection with FIG. 4.

The number of servers (FIG. 2, 206) may host (block 502) a number of databases (FIG. 2, 209), in which each database (FIG. 2, 209) implements a distinct security program. This may be performed as described in connection with FIG. 4.

The method (500) may include performing (block 503) read-only operations on a backup server. As described above, in some examples, a server (FIG. 2, 206) may be duplicated. In other words, data stored on a first server may be replicated on a backup server. Additionally, read-only operations may be diverted from the first server, and may be performed (block 503) on the backup server. Examples of read-only operations include backup operations, business intelligence data gathering, and business intelligence data reporting operations. Performing (block 503) read-only operations on the backup server, instead of on the first server may be beneficial by reducing time consuming operations that are performed on the first server. In other words, access to the data on the first server is increased, resulting in better performance of the system (FIG. 1, 100) and less impact on the first server.

The method (500) may also include facilitating (block 504) the establishment of user specific access rights. In some scenarios, system administrators may have access to the data stored in the database (FIG. 2, 209) via the management module (FIG. 2, 210) and the management network (FIG. 2, 211). In some cases it may be desirable to allow the system administrator to manage the data centers (FIG. 2, 205) without being able to view the associated data. For example, the information relating to a banking database may include personal, sensitive, or otherwise restricted information. Accordingly, the present method (500) facilitates (block 4504) the establishment of user access rights such that individuals, such as database system administrators, may see the performance of the databases (FIG. 1, 102), but may be prevented access to the data itself. Facilitating (block 504) the establishment of access rights may also be beneficial in establishing a reporting system. In other words, an accounting may be made for breaches in the security rights of an individual.

The method (500) may also include triggering (block 505) an alert when a specific user access right is violated. For example, a warning may be sent to a system administrator or other individual. In some examples triggering (block 505) an alert may include disconnecting a database (FIG. 2, 209), a server (FIG. 2, 206), or a user based on the trigger. For example, a user may attempt to access a database (FIG. 2, 209) contrary to an access right. Accordingly, the user, the database (FIG. 2, 209), the server (FIG. 2, 206), or combinations thereof may be disconnected.

Figure 6:
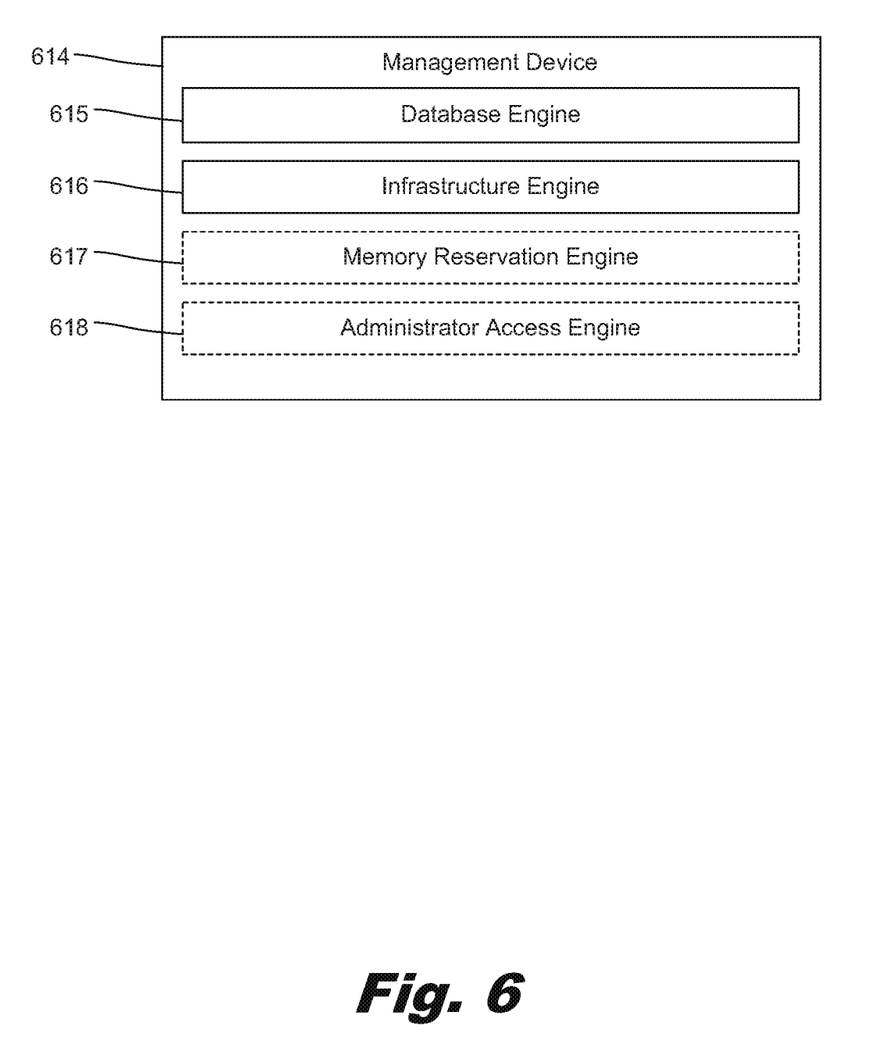
FIG. 6 is a diagram of a management device for network database hosting according to one example of the principles described herein.

FIG. 6 is a diagram of a management device (614) for scalable and secure network database hosting according to one example of the principles described herein. The management device (614) may include a database engine (615) and an infrastructure engine (616). In this example, the management device (614) may also include a memory reservation engine (617) and an administrator access engine (618). The engines (615, 616, 617, 618) refer to a combination of hardware and program instructions to perform a designated function. Each of the engines (615, 616, 617, 618) may include a processor to execute the designated function of the engine.

The database engine (615) may communicate with the database supplier (FIG. 1, 103) to supply a number of databases (FIG. 2, 209). For example, the database engine (615) may include a number of components to direct the database supplier (FIG. 1,103) on how to supply a database (FIG. 2, 209).

The infrastructure engine (616) may manage the database infrastructure (FIG. 1, 102). More specifically, the infrastructure engine (616) may include a number of components to manage the number of servers (FIG. 2, 206). For example, the infrastructure engine (616) may monitor the servers (FIG. 2, 206) and provide a portal to access the number of servers (FIG. 2, 206).

The memory reservation engine (617) may reserve memory on a server (FIG. 2, 206). As described above, memory may be reserved on a server (FIG. 2, 206) to facilitate automatic database failover, which may refer to moving data in a database (FIG. 2, 209) to the reserved memory in the event of a server (FIG. 2, 206) failure.

The administrator access engine (617) may facilitate the establishment of user specific access rights. More specifically, via the administrator access engine (617), a user may establish the extent of the administrator's access to the data. For example, a user may set an access right that permits a database administrator to view database (FIG. 2, 209) performance, without seeing sensitive, personal, or otherwise restricted program data.

Figure 7:
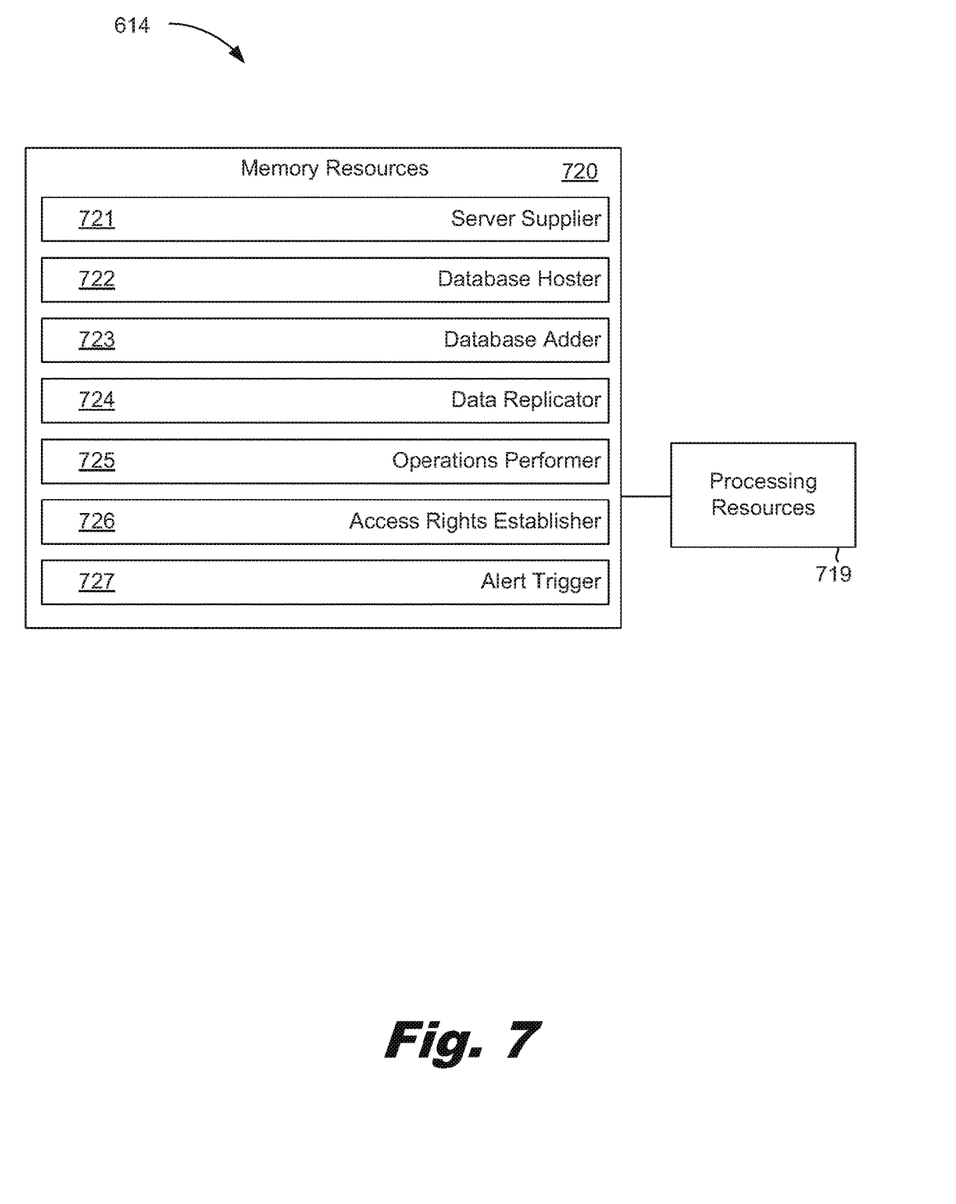
FIG. 7 is a diagram of a management device for network database hosting according to one example of the principles described herein.

FIG. 7 is a diagram of a management device (614) for scalable and secure network database hosting according to one example of the principles described herein. In this example, the management device (614) may include processing resources (719) that are in communication with memory resources (720). Processing resources (719) may include at least one processor and other resources used to process programmed instructions. The memory resources (720) represent generally any memory capable of storing data such as programmed instructions or data structures used by the management device (614). The programmed instructions shown stored in the memory resources (720) may include a server supplier (721), a database hoster (722), a database adder (723), a data replicator (724), an operations performer (725), an access rights establisher (726) and an alert trigger (727).

The memory resources (720) include a computer readable storage medium that contains computer readable program code to cause tasks to be executed by the processing resources (719). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The server supplier (721) represents programmed instructions that, when executed, cause the processing resources (719) to manage the provision of a number of servers (FIG. 2, 206). The database hoster (722) represents programmed instructions that, when executed, cause the processing resources (719) to manage the hosting of a number of databases (FIG. 2, 209) on the number of server (FIG. 2, 206). The database adder (723) represents programmed instructions that, when executed, cause the processing resources (719) to add databases (FIG. 2, 209) as needed. The data replicator (724) represents programmed instructions that, when executed, cause the processing resources (719) to replicate data from a database (FIG. 2, 209) to be replicated on a backup server. The operations performer (725) represents programmed instructions that, when executed, cause the processing resources (719) to perform an operation such as backup, gather and report business intelligence data on a backup server. The access rights establisher (726) represents programmed instructions that, when executed, cause the processing resources (719) to facilitate the establishment of user specific access rights. The alert trigger (727) represents programmed instructions that, when executed, cause the processing resources (719) to trigger an alert when an access right is violated.

Further, the memory resources (720) may be part of an installation package. In response to installing the installation package, the programmed instructions of the memory resources (720) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (719) and the memory resources (720) are located within the same physical component, such as a server, or a network component. The memory resources (720) may be part of the physical component's main memory, caches, registers, non-volatile memory, or elsewhere in the physical component's memory hierarchy. Alternatively, the memory resources (720) may be in communication with the processing resources (719) over a network. Further, the data structures, such as the libraries, may be accessed from a remote location over a network connection while the programmed instructions are located locally. Thus, the management device (614) may be implemented on a user device, on a server, on a collection of servers, or combinations thereof.

The management device (614) of FIG. 7 may be part of a general purpose computer. However, in alternative examples, the management device (104) is part of an application specific integrated circuit.

Methods and systems for compressing and compacting memory on a memory device may have a number of advantages, including: (1) providing a scalable, cloud-based infrastructure solution to social welfare benefit provision; (2) offering security not common to cloud-based infrastructures via distinct security programs; (3) flexibility in use of database infrastructure resources; (4) supporting the UC benefit program; (5) reducing physical hardware and corresponding physical hardware expenses by using a cloud-based database hosting; and (5) reducing licensing costs via virtual servers.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for network database hosting, comprising:
 a database supplier to supply a number of databases to store data, in which the number of databases implement a number of encryption operations; and
 an infrastructure to host the number of databases, in which the infrastructure comprises a number of servers,
 wherein a first server in the infrastructure comprises:
  a storage device to store a plurality of database instances of a same database, wherein the plurality of database instances are persistently maintained on the storage device, and
  an encryption component including an encryption switch to encrypt each database instance of the plurality of database instances using a unique encryption key of a plurality of encryption keys.

2. The system of claim 1, wherein the plurality of database instances that are persistently maintained on the storage device includes at least three database instances that are encrypted with at least three distinct encryption keys.

3. The system of claim 1, in which the number of servers implement a grid infrastructure to facilitate adding additional servers to the infrastructure.

4. The system of claim 1, in which the infrastructure reserves memory space to facilitate automatic database failover.

5. The system of claim 1, in which the infrastructure comprises an administrator access engine to restrict system administrator access to the number of databases.

6. The system of claim 1, in which each of the number of servers implements a distinct encryption component.

7. The system of claim 1, in which the plurality of database instances of the same database is implemented with a plurality of distinct security programs, wherein each database instance of the same database implements a unique security program.

8. A method for network database hosting by a processor, comprising:
 supplying a number of servers to host a number of databases;
 hosting a number of databases on the number of servers, in which each of the number of databases implements a distinct encryption operation;
 storing, by a first server of the number of servers, a plurality of database instances of a same database on a storage device, wherein the plurality of database instances are persistently maintained on the storage device; and
 encrypting, by an encryption component including an encryption switch, each database instance of the same database using a unique encryption key of a plurality of encryption keys.

9. The method of claim 8, wherein the plurality of database instances that are persistently maintained on the storage device includes at least three database instances that are encrypted with at least three distinct encryption keys.

10. The method of claim 8, in which the number of servers comprise a grid infrastructure.

11. The method of claim 8, in which the plurality of database instances of the same database is implemented with a plurality of distinct security programs, wherein each database instance of the same database implements a unique security program.

12. The method of claim 8, further comprising replicating the plurality of database instances on a backup server.

13. The method of claim 8, further comprising facilitating establishment of user specific access rights.

14. The method of claim 8, further comprising triggering an alert when a user specific access right is violated.

15. A computer program product for network database hosting, the computer program product comprising:
 a non-transitory computer readable storage medium comprising computer usable program code embodied therewith, the computer usable program code comprising:
  computer usable program code to, when executed by a processor, supply a number of servers to host a number of databases; and
  computer usable program code to, when executed by a processor, host a number of databases on the number of servers, in which each of the number of databases implements a distinct encryption component,
  wherein a first server of the number of servers comprises:
   a storage device to store a plurality of database instances of a same database, wherein the plurality of database instances are persistently maintained on the storage device, and
   an encryption component including an encryption switch to encrypt each database instance of the same database using a unique encryption key of a plurality of encryption keys.

16. The computer program product of claim 15, wherein the plurality of database instances of the same database is implemented with a plurality of distinct security programs, wherein each database instance of the same database implements a unique security program.

17. The computer program product of claim 15, wherein the plurality of database instances that are persistently maintained on the storage device includes at least three database instances that are encrypted with at least three distinct encryption keys.

18. The computer program product of claim 15, wherein each of the number of databases store information relating to a single information technology program.

19. The computer program product of claim 15, wherein the number of servers comprises a number of virtual servers.

20. The computer program product of claim 15, the computer usable program code further to replicate the plurality of database instances on a backup server.

* * * * *